Jan. 5, 1971  D. M. SCHWARTZ  3,552,764
MATERIAL HANDLING MACHINE
Filed Jan. 2, 1969  2 Sheets-Sheet 1

INVENTOR.
DANIEL M. SCHWARTZ
BY  *George C. Sullivan*
Agent
*Paul F. Morgan*
Attorney

United States Patent Office 3,552,764
Patented Jan. 5, 1971

3,552,764
MATERIAL HANDLING MACHINE
Daniel M. Schwartz, Los Altos, Calif., assignor to Lockheed Aircraft Corporation, Burbank, Calif.
Filed Jan. 2, 1969, Ser. No. 788,394
Int. Cl. B60g 5/02
U.S. Cl. 280—104.5
6 Claims

ABSTRACT OF THE DISCLOSURE

The load handling capability of a material handling machine having a walking beam suspension is increased by a stop member selectively positionable between the body of the machine and the walking beams to limit the pivotal movement, in one direction, of the walking beam. The stop member may be a load transmitting block which is extendible from the vehicle body to limit the upward movement of the end of the walking beam adjacent the material handling structure. The pivot point about which the weight of the vehicle counteracts the force of the applied load is thereby shifted from the axis of the walking beam to its stopped end.

---

The invention relates to a material handling vehicle and more particularly to a material handling vehicle having a walking beam suspension which is adapted to selectively increase its material load handling capability by restricting the pivotal movement in one direction of the walking beam.

The invention provides an increase in the load or force which may be exerted on a material handling structure at one end of a vehicle having a walking beam suspension before tipping the vehicle, without impairment of other aspects of the performance of the vehicle, and maintaining advantages inherent in the walking beam suspension. It will be appreciated, of course, that walking beam vehicles per se are well known in the art. The prior art also teaches means for converting a walking beam suspension into a fixed axle suspension by forcibly pivoting and rigidly locking the walking beam at an angular position with respect to the vehicle body by a heavy load carrying hydraulic ram, e.g., Pat. No. 3,299,978 to W. B. Sponsler, issued Jan. 24, 1967. The present invention does not require any tilting or locking of the walking beam suspension and does not require a heavy mechanical or hydraulic system to resist the movement of the walking beam. The extensive increase in load capacity is provided by a simple blocking mechanism selectively activated with minimal force by the vehicle operator, without imposing heavy bending forces on the walking beam or high hydraulic pressures on the holding device.

Further objects, features and advantages of the invention pertain to the particular arrangement and structure whereby the above mentioned aspects of the invention are attained. The invention will be better understood by the reference to the following description and to the drawings forming a part thereof, wherein.

Figure 1:
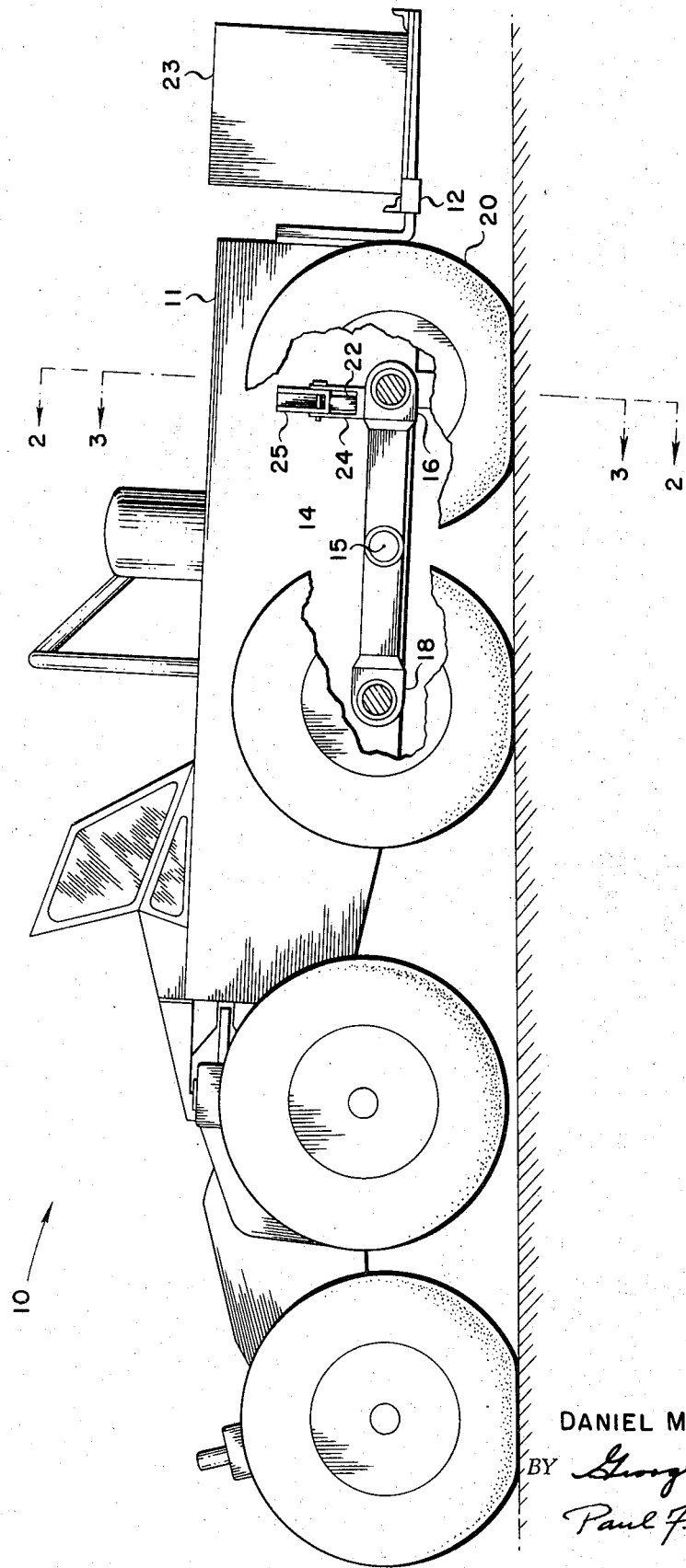
FIG. 1 is a side view of an exemplary vehicle embodying the present invention.

Referring to the drawings, FIGS. 1–4, there is shown an exemplary material handling machine 10 in accordance with the present invention. The invention is applicable to almost any type of material handling machine with a walking beam suspension. The machine 10 here comprises a body portion 11 having a material handling structure 12 at the front end thereof. The body portion 11 has a walking beam 14 suspension on the side shown, and will, of course, have a similar walking beam suspension upon the opposite side. The description herein relates, of course, essentially to the novel features of the machine 10, which features are particularly shown in FIGS. 2–4. Those components or features not described in detail herein may be of any suitable known construction (see, for example, Pat. No. 3,414,072 to W. Hodges et al., issued Dec. 3, 1968). The material handling structure may be a conventional fork lift, as shown, or a bucket loader, dozer or other earthmoving tool.

It is seen that the walking beam 14 is pivotally connected to the body portion 11 at an axis 15. The axis 15 is central the walking beam 14 and accordingly is substantially spaced from the material handling structure 12. The walking beam 14 has a first end 16 adjacent the material handling structure 12, and an opposite second end 18. Wheels, tracks, or other suitable ground engaging means are preferably mounted to the ends 16 and 18 of the walking beam. A wheel 20 is shown mounted to the walking beam 14 with its axis at the front end 16.

Figure 2:
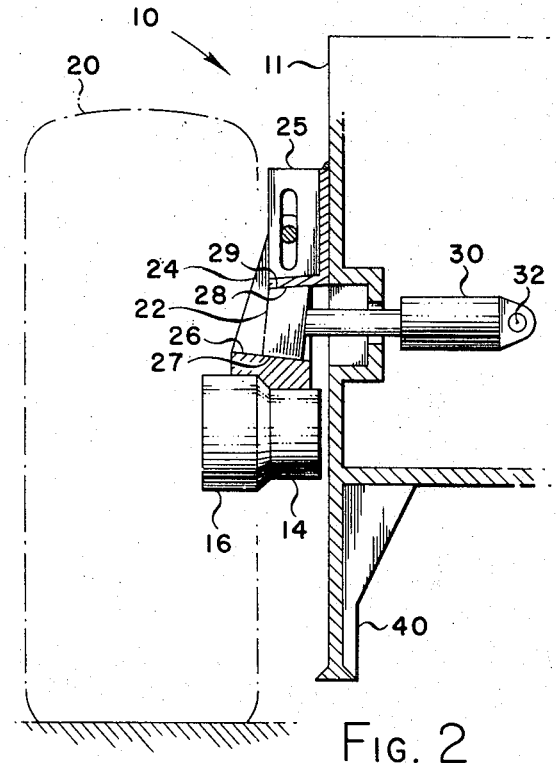
FIG. 2 is a partial cross-sectional view taken along the line 2—2 of FIG. 1, showing the vehicle in a stop activated condition.
Figure 3:
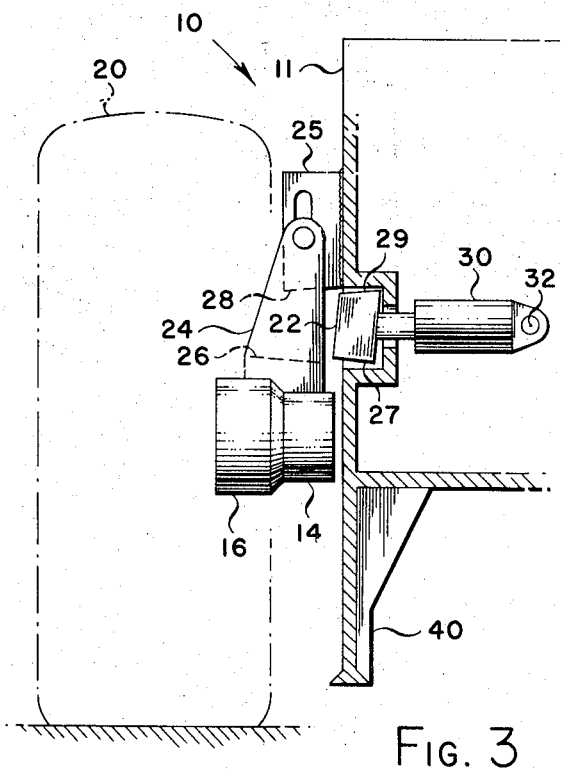
FIG. 3 is a partial cross-sectional view taken along the line 3—3 of FIG. 1 showing the vehicle in a stop deactivated condition.

Comparing FIG. 2 and FIG. 3 in particular, it may be seen that in the embodiment of machine 10 a stop block 22 is horizontally extendable and retractable from the body portion 11 of the machine 10. Extended, as in FIG. 2, the stop block 22 is selectively positionable between an extension of the body portion 11 and the first end 16 of the walking beam 14. In this position the stop block 22 limits the extent to which the walking beam 14 may pivotally rotate in one direction. Any further increase in the downward force exerted by the load 23 applied to the material handling structure 12 is transmitted to the first end 16 of the walking beam 14 by the stop block 22 and thereby directly to the wheel. Thus, for applied loads in excess of those present when the stop block 22 is selectively positioned, the pivot point about which the load 23 is counteracted by the weight of the body portion 11 of the machine is the axis of the wheel 20 rather than the central axis 15 of the walking beam 14, as is normally the case. The pivot point is shifted forward towards the material handling structure 12, greatly increasing the load 23 which may be lifted, or the downward force which may be applied to the structure 12 before tipping the vehicle.

Further, the load is transmitted directly from the body portion 11 of the machine to the wheel 20 without imposing any bending stresses on the walking beam 14. This is a significant advantage, as such stresses would be extremely high.

It will be appreciated that the front wheels 20 of the machine 10 on each side are preferably adapted to carry the full weight of the vehicle plus the load. This is because in the extreme condition (the tipping load) this force is all carried on the front wheels 20 when the stop block 22 is in position.

As shown in FIGS. 2 and 3, a load-carrying support 40 attached beneath body portion 11 can be provided to prevent severe overload on the wheel 20 by contacting the ground when the tire deflects a controlled amount. The support 40 is shown fixed to the underside of the body portion 11 adjacent the wheel 20. The lower end of the support 40 is a ground engageable shoe normally spaced above the ground level. When the stop block 22 is engaged and a maximum load is applied the tire of the wheel 20 will flatten until the support 40 engages the ground. Any further increase in load will then be transmitted through the support 40 rather than the wheel 20.

Figure 4:
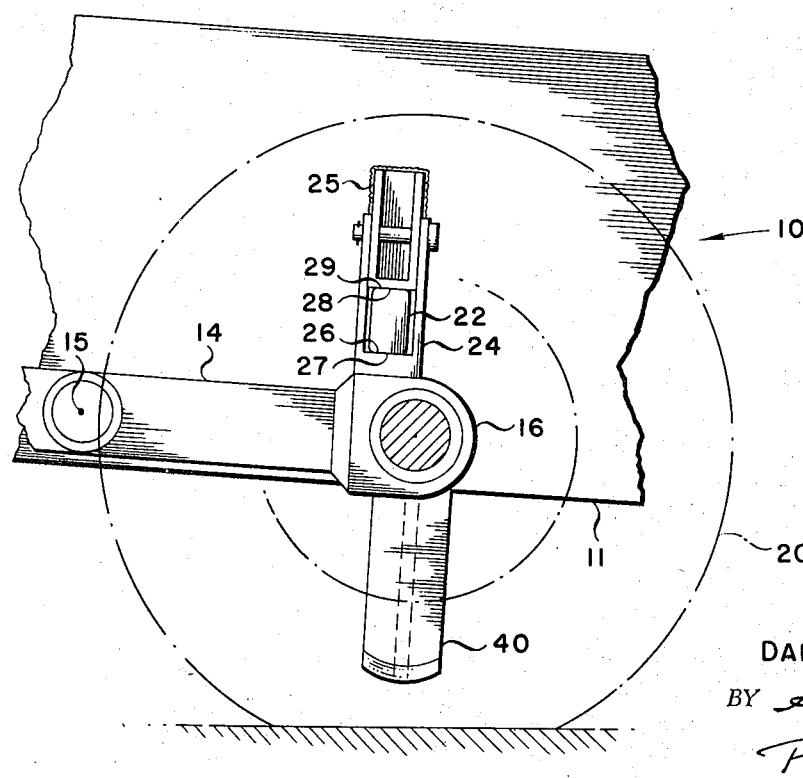
FIG. 4 is an enlarged portion of the view of FIG. 1.

Considering in detail the exemplary structure illustrated in FIGS. 2–4, there is shown a yoke 24 fixed to the top of the walking beam 14 and adapted to engage the lower surface 27 of the stop block 22. A bracket 25 is fixed to the body portion 11 and adapted to engage the upper surface 29 of the stop block 22. The stop block 22 provides a load transmitting block of steel or other suitable material between its upper and lower surfaces 27 and 29. The upper and lower surfaces 27 and 29 of the stop block 22 are generally planar and taper outwardly towards one another. It may be seen that the yoke 24 has a first planar block-engaging surface 26 which is outwardly upwardly inclined with respect to the stop block 22. The bracket 25 has a directly opposing but spaced apart second block engaging surface 28. This second surface 28 is outwardly downwardly inclined with respect to the stop block 22. The stop block 22 is adapted to be inserted between and mutually engage the surfaces 26 and 28. Its upper and lower surfaces 27 and 28 are tapered so as to be parallel with the surfaces 28 and 26, respectively. It may be seen that both of the inclined block engaging surfaces 26 and 28, the stop block 22, the axis of the wheel 20, and the first end 16 of the walking beam 14 are all substantially in vertical alignment with one another for direct vertical load transmission.

The yoke 24 and bracket 25, absent the stop block 22, provide no restriction on the normal pivotal movement of the walking beam 14 about its axis 15. Other suitable or conventional fixed restraints on the absolute maximum pivotal excursion of the walking beam may, of course, be present. The stop block 22 is extendible from its retracted position (FIG. 3) to its extended or actuated position (FIG. 2) by means of a hydraulic ram 30 or other suitable means. The force required is not great as the vehicle weight and load is applied only vertically through the stop block 22 itself. No load is carried by the ram 30. The ram 30 merely extends the stop block 22 until it is in simultaneous engagement with the first and second block engaging surfaces 26 and 28. The inner end of the cylinder of the hydraulic ram 30 has a pivotal connection 32 to the body portion 11 of the machine 10. Thus, the ram 30, and the stop block 22 connected to the piston end thereof, have vertical pivotability. The hydraulic ram 30 may be conventionally actuated by an operator control valve when desired or by automatic means responsive to an applied load in excess of the tipping force about the normal axis 15.

The tapered configuration of the stop block 22, its variable horizontal extension, and its vertical pivotability provide an automatic compensation for the initial pivotal position of the walking beam 14. It will be appreciated that the initial angular disposition of the walking beam 14 with respect to the body portion 11 at the time of the actuation of the hydraulic ram 30 will vary due to ground irregularities and varying loads. The first and second blocking engaging surfaces 26 and 28 will thus have a varying spacing therebetween depending upon the initial pivotal position of the walking beam 14 about its axis 15. The inclined upper and lower contacting surfaces 27 and 29 of the stop block 22 provide automatic compensation for these variations and insure full engagement of the stop block 22 between the yoke 24 and bracket 25. Although the extent of horizontal extension of the stop block 22 varies, the respective contacting surfaces have a sufficient horizontal extent to provide adequate load transmitting surface contact areas.

It will be appreciated that the operation of the machine 10 may be exactly the same as that of any other suitable or conventional material handling machine until the stop block 22 is extended by the hydraulic ram 30. The stop block 22 may be extended before a load is applied to the vehicle or after the vehicle is already under load and where possible tipping forces are anticipated. For example, where the material handling structure is a bucket or scoop the stop block 22 may be extended to greatly increase the breakout force where the machine is excavating a load, and then the block 22 may be retracted for the transport of the load. It will be noted that since the walking beam is stopped, not locked, that, even with the stop block 22 extended, under less than maximum load the walking beam 14 is free to pivot about its axis 15 to provide a walking beam suspension.

As an example of the greatly increased load handling capability for a vehicle in accordance with the present invention, it has been found in tests that in a vehicle having a weight of 11,710 pounds the maximum force which may be exerted on its material handling structure without vehicle tipping can be increased from 9,400 pounds without stopping the walking beam to approximately 22,000 pounds with the walking beam stopped.

It may be seen that there has been described herein an improved material handling machine. While the apparatus described herein is presently considered to be preferred, it is contemplated that further variations and modifications within the purview of those skilled in the art can be made. By way of examples, a mechanical linkage may be used in place of the hydraulic ram 30 for actuating the stop block 22, and the blocking mechanism may take other forms. Further, the walking beam 14 may be adapted for direct engagement with a stop member on the body portion, eliminating the yoke 24. Also, the stop member may be extendible from the walking beam instead of from the body. The following claims are intended to cover all such variations and modifications as fall within the true spirit and scope of the invention.

What is claimed is:

1. A walking beam suspension material handling machine comprising:
    a body portion;
    a load handling structure mounted adjacent one end of said body portion;
    a walking beam having first and second ends,
    ground engaging means on said walking beam;
    said walking beam being pivotally mounted to said body portion at an axis intermediate said first and second ends with said first end adjacent said load handling structure;
    and a stop member positionable between said body portion and said walking beam adjacent said first end of said walking beam to limit the extent of pivotal movement of said walking beam in only one direction;
    said stop member being further adapted to provide load transmission between said body portion and said walking beam;
    wherein said stop member comprises a load transmitting block, and wherein said walking beam has a first block-engaging surface thereon, and said first and second block-engaging surfaces have a varying spacing therebetween dependent upon the pivotal movement of said walking beam about said axis, said block being movable into engagement position with both said first and second block engaging surfaces by means for selectively positioning said stop member.

2. The material handling machine of claim 1 wherein said first and second block engaging surfaces are adjacent said first end of said walking beam.

3. The material handling machine of claim 1 wherein said block has a tapered configuration and is pivotally mounted for variable positioning between said first and second block-engaging surfaces dependent upon said varying spacing therebetween.

4. The material handling machine of claim 3 wherein said means for selectively positioning said stop member comprises a hydraulic ram on said body portion connected to said stop member for extension and retraction of said stop member from said body portion.

5. The material handling machine of claim 2 wherein said block has a tapered configuration and is pivotally connected to said body portion for variable positioning between said first and second block-engaging surfaces dependent upon said varying spacing therebetween and wherein said means for selectively positioning said stop member comprises a hydraulic ram on said body portion connected to said stop member for extension and retraction of said stop member from said body portion.

6. The material handling machine of claim 1 further including ground engageable support means mounted to and extending beneath said machine to limit the maximum load applied to said ground engaging means.

References Cited

UNITED STATES PATENTS 2,882,623   4/1959   Gardner _____ 180—22DX

PHILIP GOODMAN, Primary Examiner

U.S. Cl. X.R.

180—22, 24

PO-1050
(5/69)

UNITED STATES PATENT OFFICE
CERTIFICATE OF CORRECTION

Patent No. 3,552,764             Dated January 5, 1971

Inventor(s) D. M. Schwartz

It is certified that error appears in the above-identified patent and that said Letters Patent are hereby corrected as shown below:

Column 4, line 52, after "thereon," insert --said body portion ha a second block-engaging surface thereon, --

Signed and sealed this 18th day of May 1971.

(SEAL)
Attest:

EDWARD M. FLETCHER, JR.          WILLIAM E. SCHUYLER, JF
Attesting Officer                Commissioner of Patents